Figure 10:
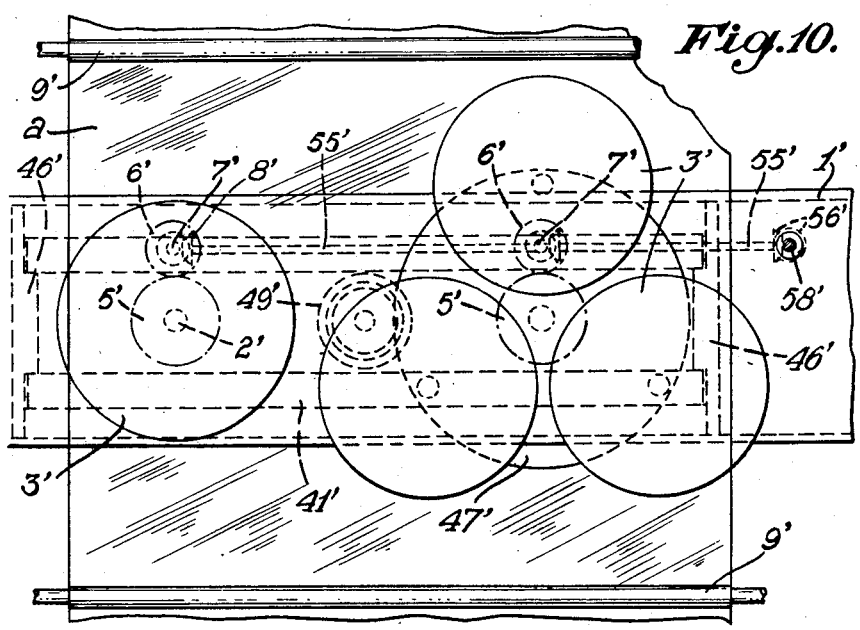

Sept. 28, 1954     E. LAVERDISSE     2,690,034
METHOD AND APPARATUS FOR CONTROLLING GLASS SURFACING TOOLS
Filed Aug. 16, 1952     7 Sheets-Sheet 1
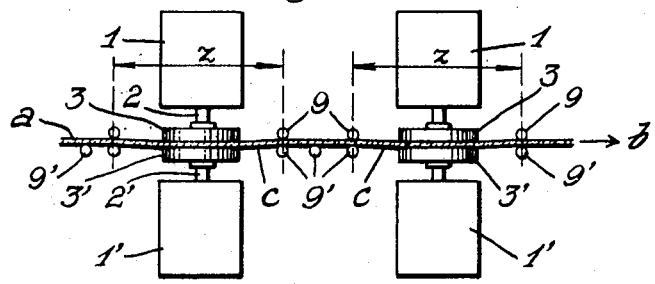
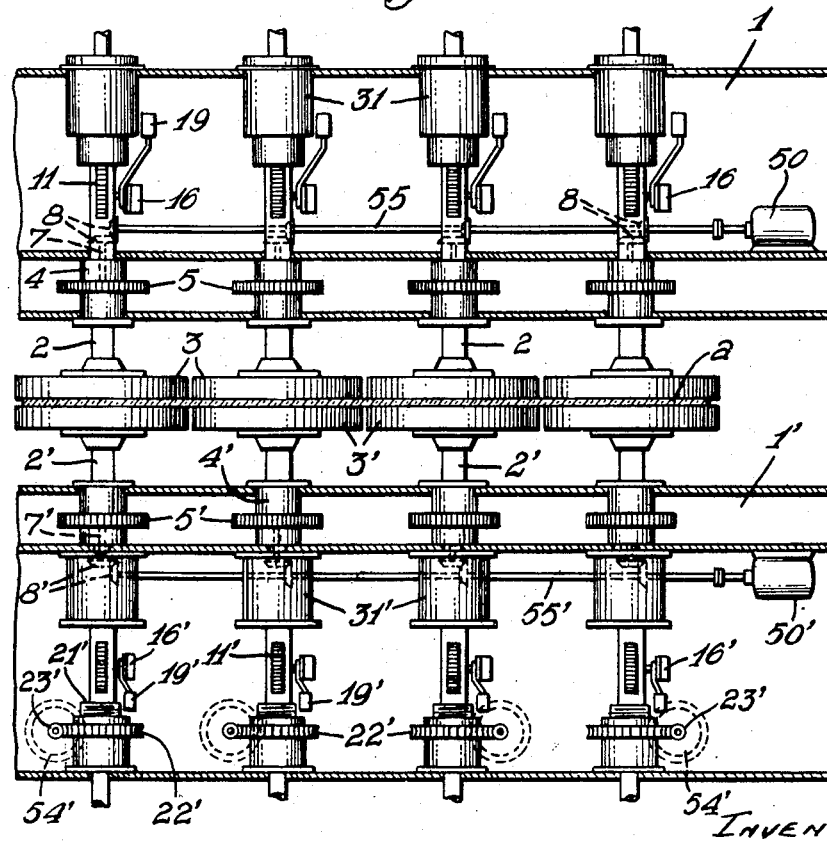
INVENTOR
EDMOND LAVERDISSE
By:
Haseltine, Lake & Co.
AGENTS Sept. 28, 1954     E. LAVERDISSE     2,690,034
METHOD AND APPARATUS FOR CONTROLLING GLASS SURFACING TOOLS
Filed Aug. 16, 1952     7 Sheets-Sheet 2
Fig.2.
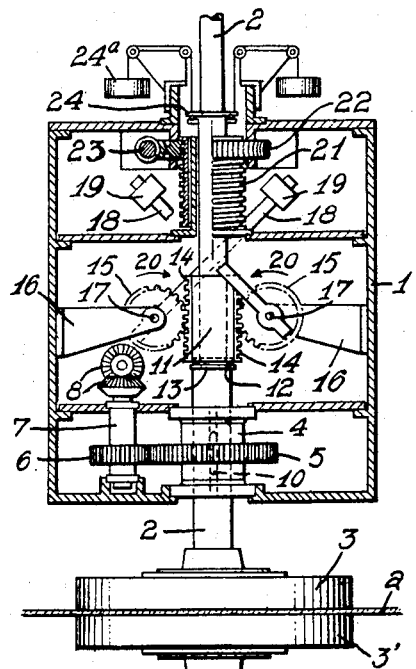
Fig.3.
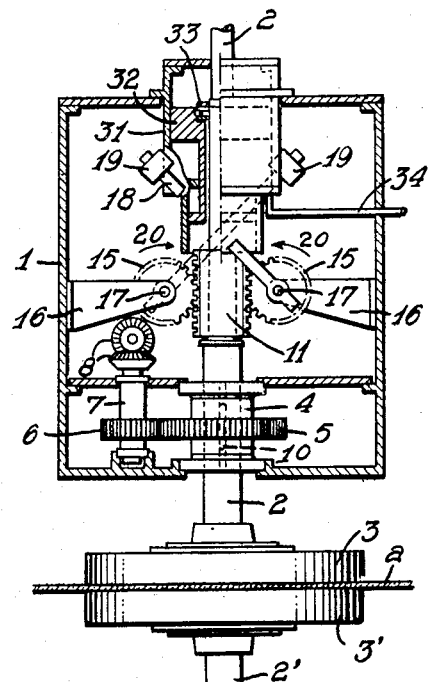
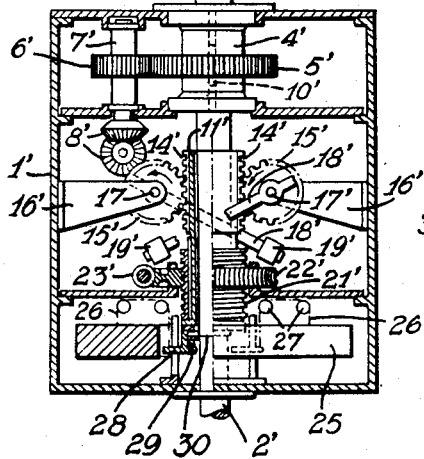
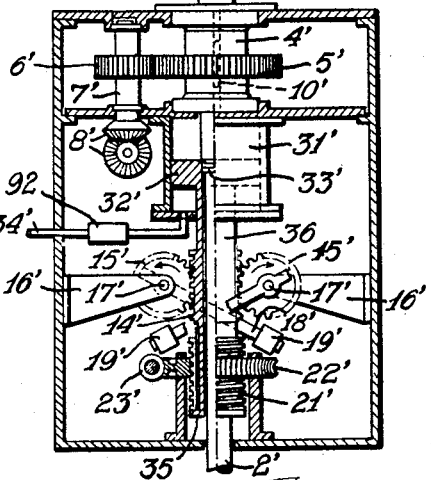
INVENTOR
EDMOND LAVERDISSE
By:
Haseltine, Lake & Co.
AGENTS Sept. 28, 1954     E. LAVERDISSE     2,690,034
METHOD AND APPARATUS FOR CONTROLLING GLASS SURFACING TOOLS
Filed Aug. 16, 1952     7 Sheets-Sheet 3
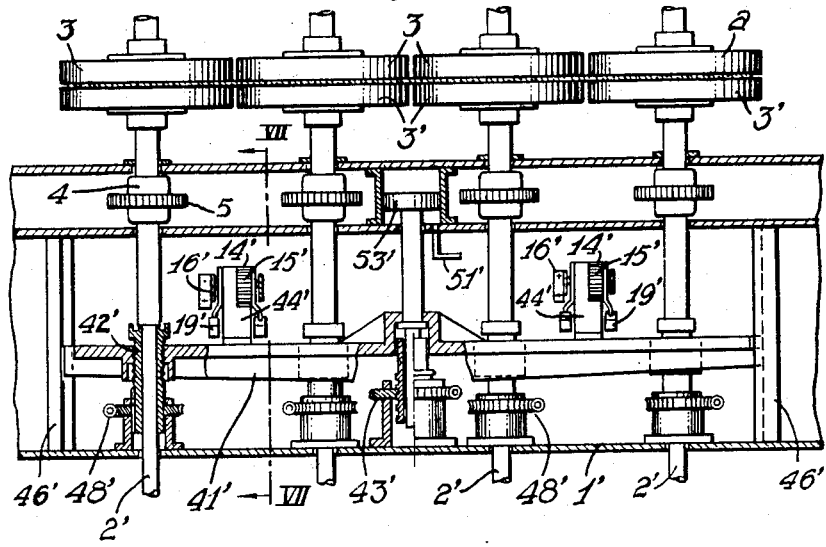
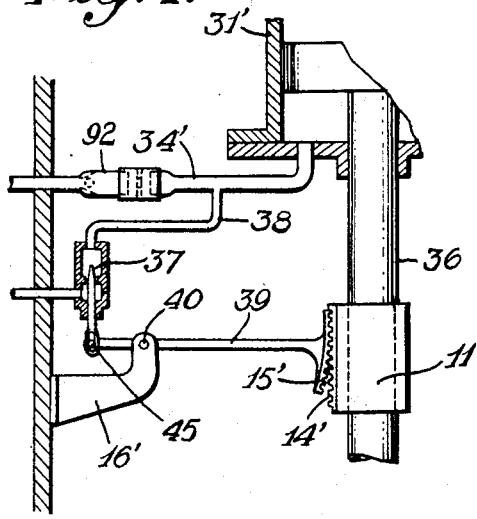
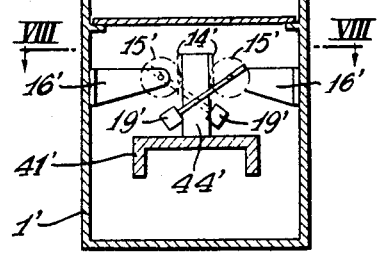
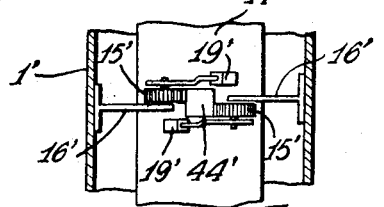

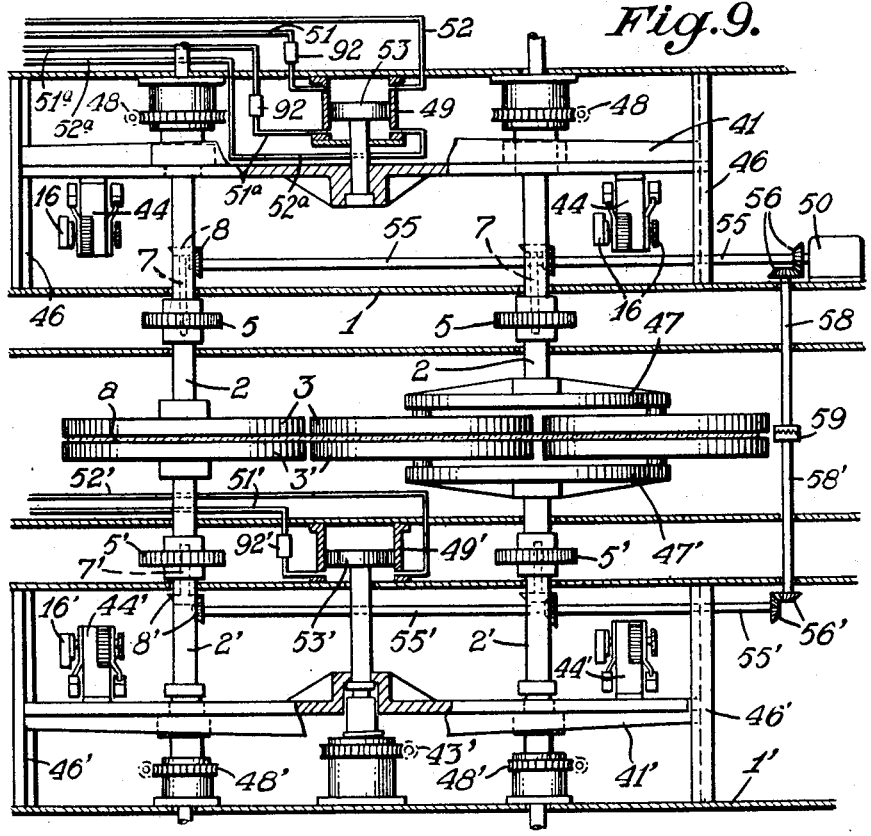

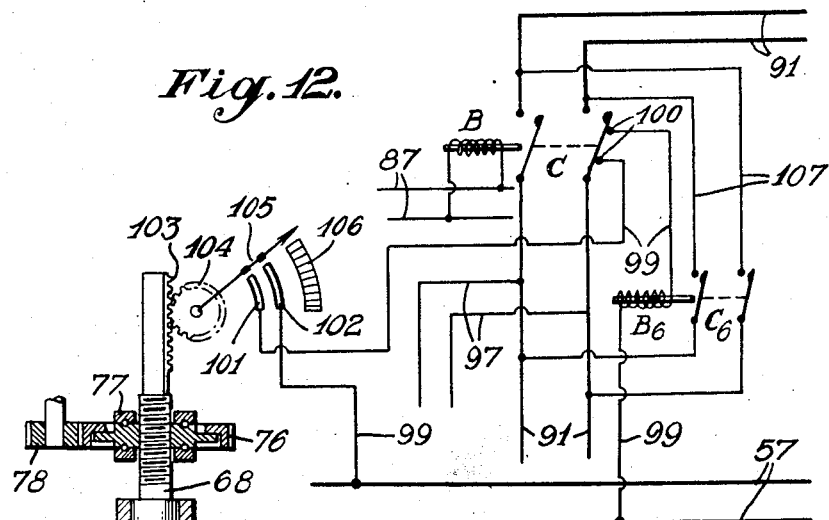
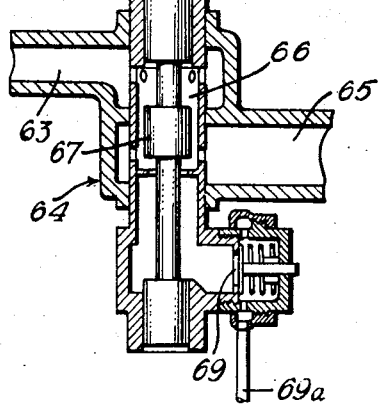
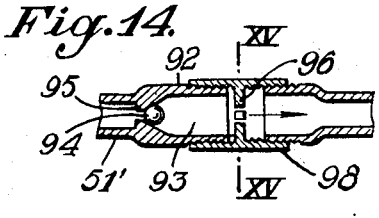

Patented Sept. 28, 1954

2,690,034

UNITED STATES PATENT OFFICE 2,690,034

METHOD AND APPARATUS FOR CONTROLLING GLASS SURFACING TOOLS

Edmond Laverdisse, Auvelais, Belgium

Application August 16, 1952, Serial No. 304,710

Claims priority, application Belgium
August 20, 1951

18 Claims. (Cl. 51—112)

In carrying into practice the simultaneous grinding and/or polishing of the two faces of a moving continuous sheet or ribbon of glass, it is of major importance to maintain the stability of the working planes of the tools, so that they always coincide with the upper face and with the lower face of the glass sheet respectively. The glass sheet rests on members, generally consisting of horizontal rollers, which support and convey it through the grinding or polishing machine. These rollers alternate with the working tools, so that the successive rollers define between them a series of zones, in each of which it is essential to maintain the working surfaces of the lower tools exactly at the same level as the generatrices, in contact with the glass, of the adjacent rollers, because a very small difference in level is sufficient to set up in the glass sheet stresses perpendicular to its plane, which are dangerous and are likely to cause breakage thereof.

Endeavours have therefore been made to apply the working tools with equal pressures against the two faces of the glass, but in the known machines this result can only be obtained for a very short time. In fact, with the lower tools situated at the required level, the pressure is exerted on the upper face of the glass sheet by the upper tools resting on the latter.

By reason of the principle of equality between action and reaction, the pressures on the two faces of the glass will be equal as long as the sheet situated between each pair of successive rollers lies in the horizontal plane tangential to these rollers. Owing to the wear of the tools, which occurs mainly in grinding machines, the supporting surface presented to the glass by the lower tools is gradually lowered in relation to the supporting rollers, which results in an increasing deflection of the glass sheet.

It has therefore been necessary, for the purpose of maintaining equality between the pressures, to make adjustments to the level of the lower tools at frequent intervals of time in order to restore the sheet to the horizontal position between successive supporting rollers and thus to avoid dangerous deflection of the glass in any of the zones situated between these rollers. In fact, account must be taken of the fact that the wear, which more or less regularly reduces the weight of all the tools, tends constantly to destroy the equilibrium between the pressures, the weight of the upper tool acting in the direction of the pressure which this tool must exert on the glass, while the weight of the lower tools acts in the opposite direction to the pressure which must be upwardly applied to this tool. Moreover, the deflection of the glass absorbs some of the energy applied in the form of pressure to the upper tool, so that the unbalance between action and reaction is accentuated.

The present invention has for its object to create novel conditions for the control of the movements of the tools towards the glass which permit of correcting the unbalance resulting from wear, and not only of permanently maintaining the constancy of the level of the working planes of the grinding tools (irons) and/or polishing tools (polishers), but also of constantly restoring the initial pressure exerted by the tools on the glass. It it based upon the novel idea of acting both on the upper tools and on the lower tools to adjust their respective positions constantly without resorting to periodical adjustments, and of permitting them, under the action of the forces applied thereto, to maintain themselves in the respective working planes determined by the rollers or other supporting members in the case of the lower tools and by the thickness of the glass sheet in the case of the upper tools. The invention also concerns the provision of automatic apparatus for obtaining this result under conditions of absolute safety.

To this end, in the method according to the invention, there are directly and continuously applied to the lower tools, which are arranged to be capable of freely moving towards the glass sheet, pressures which are opposite and equal to the pressures exerted by the upper tools and, in order to maintain equality between these pressures, the unbalance due to the wear on the tools is constantly compensated for by modifying the downward and upward pressures in opposite directions in order to bring the opposite tools into their respective working planes at each instant. This method may be applied individually to each pair of opposite tools, or to each group of tools, for example to the two groups of tools mounted respectively on the upper beam and on the lower beam of one pair. In the latter case, if one tool has become more rapidly worn than the other tools of the same group for any reason, for example owing to irregularities in the feeding of the abrasive composition, this tool will work less actively until the instant when the wear on the other tools of the same group has reached the same point.

Since the tools or groups of tools are constantly pressed against the glass and to some extent constitute floating supports for the glass, precautions must be taken to ensure that an accidental drop in the pressure on one tool or group of tools does not result in the sheet of glass being depressed by the opposite tool or group of tools. It is also necessary to ensure that disturbances in the feeding of abrasive composition or the accidental presence of unevenness on the surface of the glass, do not produce any resistance to the forward movement of the glass sheet which might be sufficient to cause breakage thereof.

In the apparatus according to the invention, the lower tools are supported by members which are constantly urged to move towards the glass.

In addition, members controlled by the movements of the tools towards the ribbon of glass act in the required direction for correcting, i. e. modifying according to requirement, the pressure of the upper and lower tools with a view to equalising them. These corrections may be exerted in a simple and convenient manner by mechanical means, but it is also possible to use other means, such as hydraulic means, to advantage.

According to the case, safety abutments and/or locking devices are provided to prevent untimely reversal of the movement of the tools towards the glass in the event of deficient pressure.

When an abnormal resistance is set up to the forward movement of the glass sheet, an immediate relaxing of the pressure is brought about. According to one feature of the invention, there is utilised for this purpose the dependence between the resistance to the rotation or other appropriate movement of the tools and the pressure of the tools on the glass, and the latter is relaxed under the control of the increase in the resistance to the actual movement of the tools on the glass. This relaxation is preferably progressively produced up to a given point, whereafter a reversal of the direction of the pressure is produced if the resistance continues to increase.

The invention is particularly applicable to grinding or polishing machines, in which the tools consist of discs mounted on rotative shafts mounted in beams or supported disposed in pairs, one above and one below the sheet or ribbon of glass.

An embodiment of the invention particularly suitable for this application consists in controlling the rotation of the tool or tools mounted on a support or beam by means of an electric motor, the feed circuit of which controls apparatus which, under the influence of the increase in the resistance to the rotation of the tools, produce the relaxation of the pressure applied to the tool or tools. When the latter are forced against the glass by a hydraulic pressure, the latter is preferably first gradually reduced in order that it may be readily restored if the disturbance of the normal operation of the apparatus is only slight and temporary. If this partial relaxation is found insufficient, the control means so act as to reverse the direction of the pressure, that is to say, to move the tools away from the surface of the glass.

In the installations for the simultaneous grinding and/or polishing of the two faces of the glass, the compensation and safety means according to the invention may be applied either to the upper tools or to the lower tools, or again to both.

In the accompanying drawings,

Figure 1 is a diagrammatic elevational view showing the deflection of the glass sheet due to the wear on the tools in the known machines.

Figure 11:
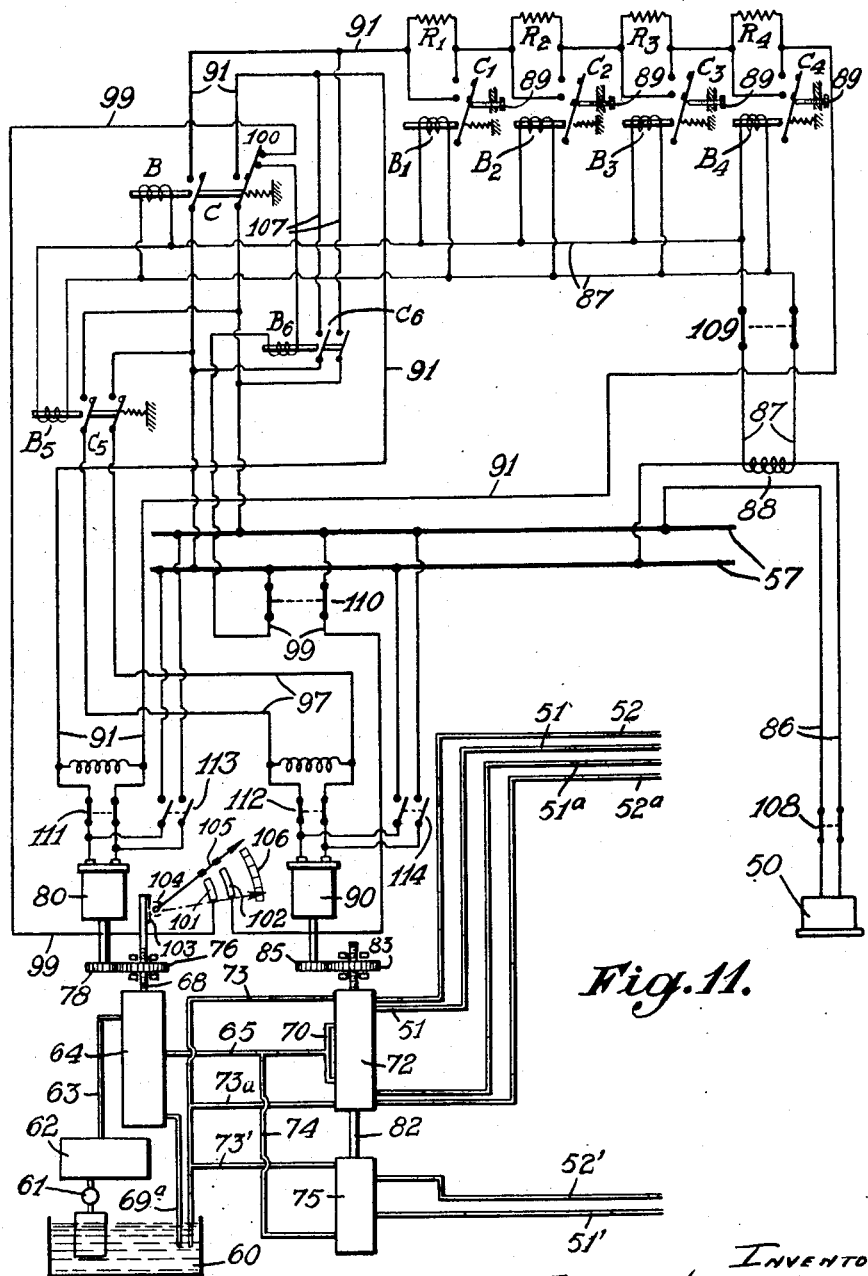

Figures 2 to 15 show by way of example apparatus according to the invention, Figure 2 showing in vertical section an arrangement for compensating for the wear applied to two irons working on the opposite faces of a glass sheet, Figure 3 is a vertical section showing a modification, Figure 4 shows diagrammatically a hydraulically controlled compensating arrangement, Figure 5 is a longitudinal vertical section through a pair of beams equipped with a series of irons and wear-compensating mechanisms, Figure 6 is a longitudinal vertical section through a lower beam according to another arrangement, Figures 7 and 8 are a vertical section on the line VII—VII of Figure 6 and a partial horizontal section on the line VIII—VIII of Figure 7, Figure 9 is a diagrammatic view of two tool-supporting beams in vertical section taken perpendicularly to the direction of forward movement of a sheet of glass subjected to grinding on both faces, Figure 10 is a plan view of the lower beam illustrated in Figure 9, Figure 11 is a diagram of the electric circuits and of the hydraulic control of the irons, Figures 12 and 13 are respectively axial sections through the regulator, and through the reversing device and the distributor which are employed in the hydraulic control of the irons, Figure 14 is a longitudinal section through the pressure blocking device, and Figure 15 is a transverse section on the line XV—XV of Figure 14.

In Figure 1, there are shown at 1 and 1' respectively, upper and lower supports or girders, in which there are mounted in known manner rotative shafts 2, 2' supporting the upper and lower working tools (irons or polishers) 3 and 3' respectively which act on the glass sheet $a$ supported by horizontal rollers 9', of which those which are close to the pairs of tools 3, 3' cooperate with upper rollers 9 for the continuous drive of the sheet $a$ in the direction of the arrow $b$.

Owing to the wear on the lower tools, the level of their working surfaces is gradually lowered, whereby a deflection of the glass sheet indicated (in exaggerated form) at $c$ is produced in each zone $z$ situated between the rollers 9' on either side of each pair of tools, under the action of the upper tools, the weight of which presses constantly on the glass.

When the difference in level reaches a certain limit, for example 2 to 3 mm., it is necessary to return the lower tools to their initial level in order to avoid the danger of breakage. In practice, it is preferred to raise these tools slightly beyond the ideal working plane, thus creating in the glass a deflection in the opposite direction to $c$, in order to reduce the frequency of adjustment. Such adjustment must nevertheless be repeated approximately every two hours in grinding machines in which an amplitude of wear of 7 cm., for example, can be permitted or an iron of a thickness of 10 cm., before scrapping the tool.

The necessity for making these frequent adjustments is avoided when use is made of the means according to the invention, a first example of which is shown in Figure 2. In this figure also, 1 designates a beam or other support in which there is mounted the vertical shaft 2 which supports the upper iron 3. During its operation, the iron 3 is set in rotation by a sleeve 4 fast with a toothed wheel 5 actuated by a pinion 6 by means of the auxiliary shaft 7 and gears 8. The tool-supporting shaft 2 can slide in the sleeve 4, which drives it in its rotation through the key 10.

The pressure exerted on the glass by the iron 3 is here represented by the weight of the latter and of its shaft 2, as also of a sleeve 11 resting, through a ball thrust bearing 12, on a shoulder 13 of the shaft 2. The said sleeve, in which the shaft 2 turns freely, is provided with two racks 14 each engaging with a pinion 15 mounted on a bracket 16 secured to the wall of the support 1. Keyed on the pin 17 of each pinion 15 is an arm 18 carrying a weight 19.

As the iron wears down, the shaft 2 and the sleeve 11 will descend and thus turn the pinions 15 and their pins 17 in the direction of the arrows 20. As the pressure exerted by the weights 19 on the sleeve 11 is proportional to the cosine of the angle of inclination of the arm 18 with respect to the horizontal, it will increase in proportion as this angle decreases, that is to say, as the weights 19 are lowered, if their displacement is maintained in the substantially rectilinear centre portion of the cosine curve. It will therefore be sufficient to dimension the weights 19, the arms 18 and their angle of inclination with a new iron in such manner that the reduction in the weight of the said iron is automatically compensated during its operation for by the increase of the pressure exerted by the weights 19.

In order to raise the shaft 2 with the iron and to lower it in order to bring the iron into contact with the glass, an externally screwthreaded sleeve 21 is provided, in which the shaft 2 can freely slide. The thread on this sleeve meshes with the internal thread on a worm wheel 22 which in turn meshes with a worm 23. The rotation of the worm 23 in one direction or the other therefore has the effect of raising or lowering the sleeve 21 along the shaft 2. The latter is provided at its upper end with an abutment 24 having a ball bearing mounted thereon. If, in the position shown in the drawing, it is desired to raise the iron 3, the worm 23 will be actuated in the necessary direction for raising the sleeve 21 and lifting the shaft by means of the abutment 24.

When the weight of the iron 3 and of its equipment does not correspond exactly to the pressure which is to be applied to the upper face of the glass, it is obviously possible to load it with additional weights, or to reduce the pressure by exerting a pull on the shaft 2 with the aid of counterweights 24a.

The arrangement of the members for the control of the lower iron 3' is such that this iron is individually pressed against the glass. This arrangement is here similar, in its broad outline, to that hereinbefore described with reference to the upper iron and the corresponding members bearing the same reference numerals provided with the index "'," but the following differences are to be noted:

(a) Since the lower iron must press on the glass in the upward direction in order to balance the pressure of the upper iron 3, a counter-weight 25 is here used to exert this counter-pressure. This counter-weight 25 is suspended from cables 26 which pass over pulleys 27 and are attached to a ring 28 which is provided with a ball thrust bearing 29 on which a shoulder 30 of the shaft 2' rests.

(b) The weights 19' are so disposed as to act in a direction opposite to the constant thrust exerted by the weight 25, that is to say, in such manner as to compensate for the reduction in the weight of the iron 3' due to wear. The sleeve 11' is downwardly extended as far as the ring 28 on which it bears.

In the constructional form shown in Figure 3, in which the same reference numerals designate the same parts as in Figure 2, the arrangement for raising the upper iron is replaced by a hydraulic cylinder 31, the piston 32 of which drives the shaft 2 through the ring 33 when the oil under pressure is admitted below the piston through the duct 34 in order to lift the iron 3, the lowering of the iron taking place under the action of its own weight.

The arrangement for pushing the lower iron 3' comprises, instead of the counter-weight 25, a hydraulic cylinder 31', the piston 32' of which acts on the shaft 2' through the ring 33'. In order to avoid a violent thrust on the glass in the event of the upper iron not being in position, an abutment may be provided to limit the upward displacement of the iron 3'. In the example illustrated in Figure 3, this abutment, which is designated by 35, is situated at the base of the hollow rod 36 of the piston 32'. A pre-adjusting device controlled by screws 21', 22', 23' is disposed at the lower end of the shaft 2' and the abutment 35 stops against the base of the sleeve 21' if necessary.

In order that the iron 3' may not fall back in the event of deficient pressure in the duct 34' for feeding the cylinder 31', this duct may be provided with a device 92 comprising a non-return valve or ball. The danger of depression of the glass sheet under the thrust of the iron 3 is thus avoided.

The reduction in the pressure exerted on the iron in order to allow for the wear may also be obtained by acting on the hydraulic pressure in the cylinder 31'. In the example of Figure 4, this pressure reduction is obtained by the gradual opening of a needle valve 37 disposed in a discharge pipe 38 connected to the duct 34' for feeding the cylinder 31'. The needle 37 is here controlled by the rack 14', the toothed sector 15' and the lever 39 linked on the one hand at 40 to the fixed bracket 16', and on the other hand to the stem of the needle 37 by an adjustable articulation 45.

Figure 5 shows a pair of beams 1, 1' in which a number of tools 3, 3' are mounted side-by-side, and are constantly pressed against the glass sheet, the upper tools by their own weight, for example, the lower tools by a hydraulic pressure exerted in the cylinders 31' similar to those of Figure 3. Each shaft 2' is provided with an individual vertical adjustment device 21', 22', 23' controlled by a hand wheel 54'.

Compensating means comprising oscillating weights 19, 19' and racks 11, 11' correct the pressure of the tools 3, 3' on the glass as a function of the weight reduction due to the wear. The rotation of the shafts 2, 2' is controlled by motors 50, 50', through the horizontal shafts 55, 55' and the gears 8, 8' and 5, 5'.

When applied to a polishing machine, an arrangement such as that shown in Figure 5, in which the vertical displacement of each lower tool is individually controlled, is particularly advantageous because it enables the lower tools constantly pressed against the lower face of the sheet to reach the glass at the base of the depressions which, when they occur, frequently escape the polishing in the existing machines.

It is also possible, in accordance with another embodiment of the invention, to make the tools mounted on a common support or beam integral in their vertical displacements. In Figures 6 to 8, the shafts 2' of the iron 3' of the lower beam 1' are mounted on a cross member 41' through screwthreaded sleeves 42' actuated by manual control means comprising worms 48' which permit their individual vertical adjustment in the cross member 41' by the initial position of which can in turn be vertically adjusted by the screw device 43', which is actuated by hand or by a servo-motor. The cross member 41', which is guided between vertical slide ways 46', is forced upwardly against the glass sheet a by the hydraulic piston 53'. Wear-compensating devices 44' comprising oscillating weights 19' similar to those shown in Figures 2 and 3 bear on the beam 14 through brackets 16' and act on the cross member 41' through racks 14'.

If at any instant one of the tools 3' is worn to a greater extent than the other tools of the same beam, the work of this tool will be slowed down or stopped until the other tools have reached the same degree of wear. The same arrangement may obviously be employed in the upper beam.

Figure 9 shows at 1 and 1' respectively an upper beam and a lower beam which are supported in known manner by frames (not shown) on either side of the glass sheet a resting on the horizontal rollers 9' (Figure 10), the generatrices of which determine the horizontal working plane of the lower tools 3'.

Mounted in the upper beam 1 are vertical rotative shafts 2, one of which supports an iron 3 and the other a disc 47 on which is mounted a group or set of three irons 3, this arrangement obviously being capable of variations as required.

The shafts 2 are provided with vertical adjustment devices 48 and supported by a cross member 41 vertically guided in the slideways 46. The tools 3 having previously been brought to the same level by the devices 48, the required pressure is exerted on the glass a by the admission of oil under pressure into the cylinder 49, above the piston 53 through the duct 51 until it comes into contact with the glass sheet resting on the rollers 9'. The duct 52a is provided for the discharge of the oil below the piston 53, while the ducts 51a and 52 serve respectively for the application of the pressure under the piston 53 and the discharge of the oil above the piston 53.

The shafts 2 are set in rotation by an electric motor 50 through auxiliary shafts 55 and 7 (Figure 9) and gears 6.

The arrangement of the lower beam 1' and of the members which it supports is similar to that hereinbefore described, and the same numerals, with the index "'," have been employed for the said parts as for the corresponding parts of the upper beam. For the rotation of the shafts 2', the auxiliary shaft 55' (Figures 9 and 10) is actuated with the aid of the pinions 56' by a stub shaft 58' connected by a coupling 59 to a stub shaft 58 directly actuated by the motor 50 with the aid of the pinions 56. When the tools 3' have been set to the required level by the devices 48' and the cross member 41' has been adjusted to its initial position by the device 43', the oil under pressure is admitted into the cylinder 49', below the piston 53', preferably at the same time as the admission into the cylinder 49. A single pair of ducts 51', 52' is here sufficient for the application of the pressure below the piston 53' and the discharge of the oil above the piston 53', because as soon as the pressure is relaxed at 51', the piston 53', the cross member 41' and the irons 3' descend again under the action of their own weight.

It is always essential for the irons 3, 3', which are preferably (but not necessarily) situated exactly opposite one another, to be applied against the glass with equal and constant pressures. For this purpose, the cylinder 49', for moving the lower tools has a larger diameter than the cylinder 49 of the upper beam, since the pressure in the cylinder 49' must overcome the weight of the cross member 41' and of the lower tools, while the weight of the cross member 41 and of the upper tools is added to the pressure in the cylinder 49. In order to prevent the wear of the tools in the course of their operation from destroying the equilibrium of the pressures on the glass, the cross members 41, 41' are provided with compensating devices 44, 44' similar to those shown in Figures 7 and 8.

In order that an accidental relaxation of the pressure in one of the oil supply ducts 51, 51' may not result in an unbalance capable of causing breakage of the glass sheet, non-return devices 92, 92' for example of the ball type, are disposed in these ducts. Such a device is shown in Figures 14 and 15, in which a chamber 93 containing the ball 94 is provided with two seats separated by a distance adjustable with the aid of the sleeve 96. One of the seats, the seat 95, is closed by the ball when a counter-pressure is set up, while the ball is normally applied against the other seat 96 which permits the passage of oil in the direction of the arrow. If the feed pressure only decreases slightly, the ball moving slowly towards the seat 95 will permit the discharge of a quantity of liquid depending upon the distance between the seats. In the event of a sudden pressure drop in the duct 51 or 51', or of an increase in pressure in the cylinders 49, 49', the ball will be returned on to its seat more rapidly but with a sufficient delay to permit retraction of the irons, for example by an amount of 0.1 to 0.5 mm. as well as the tripping of a safety device such as that hereinbefore described.

The oil intended to feed the cylinders 49, 49' is drawn from a tank 60 by a pump 61 which delivers it into an accumulator 62, whence it passes through the duct 63 into the pressure regulator 64 (Figures 11 and 12). During normal operation, the oil under pressure enters through 63 and leaves through 65 after having passed through the chamber 66, in which a throttle piston 67, the position of which is vertically adjustable by means of the rod 68, determines the date of flow of the oil from the outlet duct 65, and surplus being admitted through the spring-loaded valve 69 into the discharge duct 69a and returning to the tank 60.

From the duct 65, the oil at the required pressure is normally admitted through the duct 70 into the chamber 71 of the reversing devices 72 (Figures 11 and 13) in order to be sent through the duct 51 into the upper chamber 49 above the piston 53, while the oil situated below the piston 53 returns to the tank 60 through the ducts 52a and 73a.

Connected to the pressure duct 65 is a duct 74 which passes the oil under pressure through the distributor 75 and the duct 51' into the lower cylinder 49' below the piston 53', in the position illustrated in the drawing, which corresponds to normal operation. The return duct 52' is then cut off from the discharge duct 73' leading to the tank 60.

The upper part of the rod 68 of the regulating piston 67 is screwthreaded and engaged in an internally threaded wheel 76 which is mounted in fixed bearings 77 and meshes with a toothed wheel 78 controlled by a motor 80 (Figure 11).

The reversing device 72 and the distributor 75 are provided with pistons 79, 81 respectively, supported by a common rod 82, the screwthreaded end of which is engaged in an internally threaded wheel 83 which is mounted in fixed bearings 84 and engages with a toothed wheel 85 controlled by a motor 90.

The starting of the motor 80 will thus have the effect of operating the regulator 64 and the starting of the motor 90 will have the effect of operating the reversing device 72 and the distributor 75.

During normal operation, the iron-supporting cross members 41, 41' move progressively in the direction of the constant pressures which are applied thereto, these movements being limited to the compensation for the wear of the irons, the said pressure being balanced and maintaining the constancy of the working planes of the tools on the glass. Under normal conditions of pressure, speed and feed of abrasive composition, the power absorbed by the motor 50 controlling the rotation of the tools is normal. However, if a disturbance occurs, for example in the feed of abrasive composition to the tool, or abnormal resistance due to local excessive thickness of the glass, jamming of the tools is likely to occur, which will bring about breakage of the glass by opposing the forward movement thereof.

These modifications of the working conditions are immediately manifested by an increase in the resistance opposed to the motor 50. The circuits illustrated in Figure 11 show how the increase in the absorption of power by the motor 50 may be utilised to bring about the successive starting of the motors 80 and 90.

In the feed circuit 86 of the motor 50 connected to the supply 57 there is connected the primary winding of a transformer 88 such that if this motor absorbs 50 amperes in normal operation, the current induced in the secondary circuit 87 is, for example, 0.5 ampere. Connected in this circuit 87 are the coils B, B1, B2, B3, B4 and B5 of electro-magnets, the respective spring-loaded armatures C, C1, C2, C3, C4 and C5 of which are separated from the cores by air gaps of increasing lengths adjusted by the screws 89, in order that these armatures may be successively actuated immediately the induced current flowing through the circuit 87 increases to a sufficient extent.

The coil B controls through its armature C the closing of the feed circuit 91 of the motor 80. As long as the current in the circuit 87 remains in the neighborhood of the normal value of 0.5 ampere, no armature will be attracted. If the load on the motor 50 increases and the current in 87 reaches 0.55 ampere, the coil B closes, through its armature C, the circuit 91 which feeds the motor 80 through the series resistances R1, R2, R3 and R4. The motor 80 is slowly started and produces a slow movement of the regulating piston 67 in the direction of a reduction of the pressure applied to the pistons 53, 53'.

If, despite this action, the power absorbed by the motor 50 continues to increase, the current in the circuit 87 will become sufficiently strong to close the armature C1, which will short-circuit the resistance R1 and will then act on the armatures C2, C3, C4 in order to short-circuit the resistances R2, R3 and R4 successively and to accelerate the movement of the motor 80.

If the pressure reduction thus produced is still insufficient to stop the increase of the current in the circuit 87, a coil B5 is energised and closes, through its armature C5, the feed circuit 97 of the motor 90. The latter raises the rod 82 and its pistons 79, 81 which close the ducts 51, 52a and 51', and open the ducts 51a, 52 and 52', thus producing the reversal of the pressure in the cylinders 49, 49' and moving the tools 3, 3' away from the glass.

As long as the motor 90 has not been started, it is desirable for the restoration of the normal pressure to take place automatically, in order that any brief disturbance may not interrupt the normal operation of the machine. To this end, there is connected to the supply 57 (Figures 11 and 12) a circuit 99 which comprises the winding of a coil B6, the contacts 100 and the conductor segments 101, 102. Normally, this circuit 99 is closed at 100 by the armature C, but it is open at 101, 102.

Mounted at the upper end of the rod 68 of the regulator 64 is a rack 103 which meshes with a pinion 104 on which a brush 105 is keyed. When, as a result of abnormal resistance to the operation of the motor 50, the coil B closes the circuit 91, its armatures simultaneously break the circuit 99 at 100 and the rod 68 of the regulator moves upwardly, the motor 80 turning in the direction of a pressure reduction in the cylinders 49, 49'. The brush 105 is thus moved over the segments 101, 102 extending over a predetermined part of its travel, past a scale 106 indicating the value of the pressure.

If the resistance to the rotation of the motor 50 returns to normal while the brush 105 is connecting the contacts 101, 102, the contacts of the armatures C4, C3, C2, C1 and C are closed again and the circuit 99 is closed by the contacts 100. The coil B6 then closes the contact C6 connected in a circuit 107, which reverses the connections of the motor 80 to its feed circuit 91 and produces the rotation thereof in the direction of the increase of the pressure in the cylinders 49, 49'. This operation continues until the circuit 99 is broken by the separation of the brush 105 from the contact segments 101, 102, normal operating conditions then being restored.

If, on the other hand, the disturbance which has brought the motor 80 into operation persists, the motor 90 is started in order to reverse the pressures on the pistons 53, 53' and the manual intervention of the operating personnel becomes necessary in order to restore normal operation after the current has been cut off. For this purpose, switches 108, 109 and 110 are provided to enable the operators to break the circuits 86, 87 and 99 respectively, switches 111, 112 to break the circuits 91 and 97 respectively, and switches 113, 114 to connect the motors 80 and 90 respectively, temporarily to the supply 57 in order to return the regulator 64, the reversing device 72 and the distributor 75 into their initial positions in order to enable the work to be resumed under the control of the automatic safety arrangement.

Naturally, the form of the beams or supports 1 and the details of the various mechanisms and devices described with reference to the drawings may be modified without departing from the scope of the invention.

I claim:

1. Method of controlling vertically movable upper and lower working tools simultaneously surfacing both faces of a horizontally moving glass sheet in a glass surfacing machine; said method comprising the steps of applying a downward pressure to the tools operating on the top face of said sheet and an upward pressure to the tools operating on the bottom face of said sheet and balancing said downward pressure by adding to said downward pressure of the upper tools an increasing pressure compensating for the loss of weight due to wear of the upper tools, and subtracting from said upward pressure exerted on the lower tools an increasing pressure compensating for the loss of weight due to wear of the lower tools.

2. In a method as claimed in claim 1, locking the tools against backward movement away from the surface of the glass beyond a predetermined tolerance.

3. In a method as claimed in claim 1, rotating the working tools about their respective axes and relaxing said downward and upward pressures applied to the upper and lower tools, respectively, in case of abnormal resistance to the rotation of the tools.

4. In a method as claimed in claim 1, rotating the working tools about their respective axes, relaxing said downward and upward pressures applied to the upper and lower tools, respectively, in case of abnormal resistance to the rotation of said tools, and reversing said pressures upon continuation of the abnormal resistance beyond a predetermined value.

5. In a method as claimed in claim 1, rotating the working tools about their respective axes, relaxing said downward and upward pressures applied to the upper and lower tools, respectively, in case of abnormal resistance to the rotation of said tools, and restoring said pressures if the abnormal resistance vanishes before it reaches a predetermined value.

6. In a glass surfacing machine, the combination of means for feeding a horizontal sheet of glass, vertically movable surfacing tools for operating on both faces of said sheet, means for applying a downward pressure to the tools operating on the upper face of said sheet and means for applying an upward pressure to tools operating on the lower face of said sheet and balancing said downward pressure, and means for adding and subtracting from said downward and upward pressures, respectively, in dependence on the wear of said tools to compensate for any unbalance due such wear.

7. In a glass surfacing machine, the combination of means for feeding a horizontal sheet of glass, vertically movable surfacing tools for operating simultaneously on both faces of said sheet, said tools comprising upper tools and lower tools, means for applying a downward pressure to said upper tools, means for applying to said lower tools an upward pressure balancing said downward pressure, means for adding to said downward pressure an increasing pressure to compensate for the loss of weight due to wear of the upper tools, and means for subtracting from said upward pressure an increasing pressure to compensate for the loss of weight due to wear of the lower tools.

8. A glass surfacing machine as claimed in claim 7, said wear compensating means each comprising pivoted weights, pinions and racks controlled by the vertical movements of said tools.

9. A glass surfacing machine as claimed in claim 7, wherein hydraulic means are provided for applying pressure to said tools and said wear compensating means comprise a discharge valve responsive to the movements of the said tools to control said hydraulic pressure means.

10. A glass surfacing machine as claimed in claim 7, wherein an adjustable abutment is provided to limit the movement of each tool towards the glass.

11. In a glass surfacing machine, the combination of means for feeding a horizontal sheet of glass, pairs of vertically movable supports extending horizontally across the path of said glass sheet, each pair comprising an upper support and a lower support, surfacing tools on both supports of each pair, means for applying a downward pressure to said upper support and means for applying an upward pressure to said lower support, means for adding to said downward pressure an increasing pressure to compensate for the loss of weight due to wear of the tools on said upper support, and means for subtracting from said upward pressure an increasing pressure to compensate for the loss of weight due to wear of the tools on said lower support.

12. A glass surfacing machine as claimed in claim 7, wherein hydraulic means are provided for applying pressure to said tools, said hydraulic means comprising a non-return valve so arranged as to act with a slight delay to permit a slight retraction of the tools.

13. A glass surfacing machine as claimed in claim 7, wherein the surfacing tools are of the rotating disc type, comprising vertical shafts for said tools, means for rotating said shafts, and supports carrying said shafts and said pressure applying means.

14. A glass surfacing machine as claimed in claim 9, comprising safety means responsive to the pressure exerted on the glass by a tool for releasing said pressure when it exceeds a predetermined value.

15. A glass surfacing machine as claimed in claim 11, wherein the surfacing tools are of the rotating disc type, comprising vertical shafts for said tools, means for rotating said shafts, said shafts being carried by said supports, and electrically controlled safety means responsive to the pressure exerted on the glass by a tool for releasing said pressure when it exceeds a predetermined value.

16. A glass surfacing machine as claimed in claim 7, wherein the surfacing tools are of the rotating disc type, comprising electric motors for rotating said tools, one such motor rotating a pair of oppositely disposed tools, and safety devices controlled by said electric motors for simultaneously relaxing excessive local pressure exerted on the glass by any pair of oppositely disposed tools when the resistance to rotation of said tools exceeds a predetermined value.

17. A glass surfacing machine as claimed in claim 16, wherein each safety device comprises reversible means for temporarily reducing the local pressure exerted by any pair of tools on the glass.

18. A glass surfacing machine as claimed in claim 16, wherein each safety circuit comprises means for temporarily reducing the local pressure exerted by the pair of tools on the glass and means for reversing said pressure if it increases beyond a second predetermined value.

References Cited in the file of this patent

UNITED STATES PATENTS

| Number | Name | Date |
|---|---|---|
| 1,705,918 | Harrington | Mar. 19, 1929 |
| 1,729,498 | Waldron | Sept. 24, 1929 |
| 2,269,197 | Hamilton | Jan. 6, 1942 |

FOREIGN PATENTS

| Number | Country | Date |
|---|---|---|
| 221,029 | Great Britain | Sept. 4, 1924 |
| 455,404 | Italy | Mar. 1, 1950 |
| 505,891 | Great Britain | May 15, 1939 |
| 817,793 | France | Sept. 10, 1937 |